UNITED STATES PATENT OFFICE.

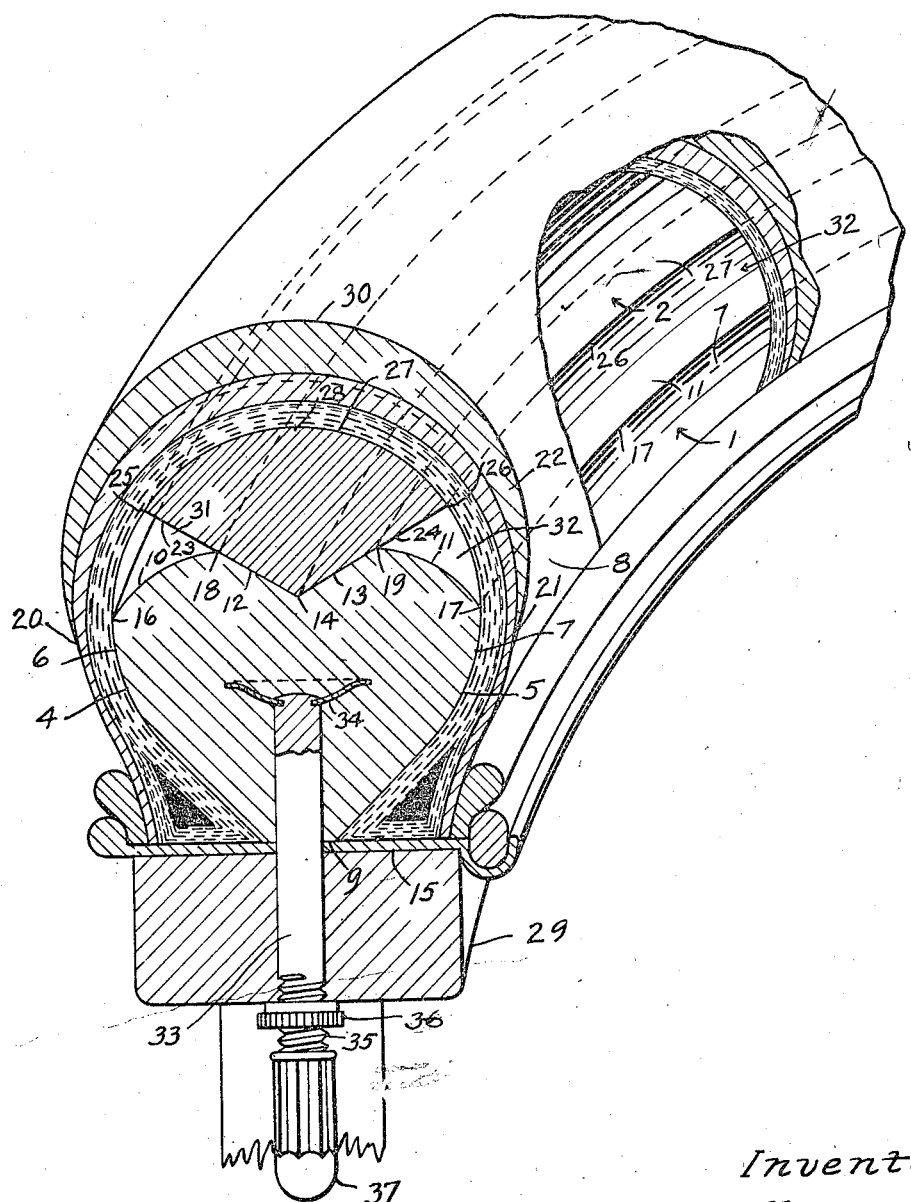

HENRY M. HENNING, OF HINKLEY, CALIFORNIA.

INNER TIRE.

1,298,945.   Specification of Letters Patent.   Patented Apr. 1, 1919.

Application filed January 30, 1918. Serial No. 214,544.

*To all whom it may concern:*

Be it known that I, HENRY M. HENNING, a citizen of the United States, residing at Hinkley, in the county of San Bernardino and State of California, have invented new and useful Improvements in Inner Tires, of which the following is a specification.

My object is to make an inner tire to be inserted into a casing and take the place of the pneumatic inner tube.

The figure is a fragmentary cross-sectional perspective showing an inner tire embodying the principles of my invention in a casing upon a rim ready for use.

The inner tire consists of the supporting member 1 and the tread member 2.

The supporting member 1 is a solid elastic composition of rubber and canvas molded into the desired size and shape. In cross-section the support 1 is bounded by the lines 4 and 5 adapted to fit the inner faces 6 and 7 of the casing 8, the line 9 connecting the inner ends of the lines 4 and 5, the curved lines 10 and 11 extending inwardly from the outer ends of the lines 4 and 5, and the straight lines 12 and 13 extending inwardly from the inner ends of the lines 10 and 11 and meeting at the axial center 14 of the casing cavity. In side elevation the supporting member 1 is circular and endless. The line 9 may be flat and fit against the outer face of the tire rim 15. The lines 4 and 5 extend from the ends of the line 9 and fit the inner faces of the casing to the points 16 and 17, said points 16 and 17 being substantially on a horizontal line with the center point 14. The lines 10 and 11 are arcs of a circle and extend to the points 18 and 19 which are in vertical planes substantially half-way between the points 16 and 14 and 17 and 14, respectively, and the straight lines 12 and 13 extend from the points 18 and 19 to the center point 14. The points 16 and 17 are substantially in line with the edges 20 and 21 of the rubber tread 22 of the casing.

In cross-section the tread member 2 is bounded by the straight lines 23 and 24 extending radially from the center point 14 to the points 25 and 26 upon the inner faces of the casing cavity, and the circular line 27 connecting the outer ends of the lines 23 and 24 and concentric to the center point 14. Relative to a vertical plane in line with the center point 14 and crossing the casing at the point 28, the line 27 extends sixty degrees each way from the point 28. The tread member 2 is soft rubber molded and moderately vulcanized so as to make the tread 2 more elastic than the tread support 1. The lines 23 and 24 of the tread normally contact with the lines 12 and 13 of the tread support from the point 14 to the points 18 and 19, said points 18 and 19 being substantially half-way from the point 14 to the points 25 and 26 and the contacting portion of the tread is a blunt wedge resting in the wide V-shaped groove formed by the lines 12 and 13.

The tread may be inserted into the casing in a manner similar to the insertion of an inner tube and then the tread support may be inserted into the casing against the tread. Then the tire may be applied to the rim 15 and applied to a wheel 29 and is ready for use. The wheel 29, the rim 15, and the casing 8 may be any of the well known constructions, the object being to make an inner tire for universal use any place that an inner tube can be used.

When a wheel has been equipped with a casing carrying my inner tire, pressure upon the ball 30 of the tread 22 of the casing, as when the wheel is running upon the ground, will press the wedge of the tread 2 into the groove of the tread support 1 and expand the tread support laterally and bring the outer portions of the lines 23 and 24 into contact with the lines 10 and 11 more or less, according to the load. The triangular spaces 31 and 32 between the lines 10 and 11, the outer halves of the lines 23 and 24, and the corresponding faces of the casing cavity, will simply be filled with air at or near atmospheric pressure. The curved outer face of the tread 2 between the points 25 and 26 will yield more or less to the unevenness of the road and to the pressure exerted by the load and the tendency all the time will be to return the casing 8 to its normal shape.

The inner tire thus constructed may be made to fit any casing cavity and it is thought that it should be made to fit smoothly and closely in the cavity. The exact metes and bounds of the angles, straight lines, and curves may be varied, at least to some extent, without departing from the spirit of my invention.

If it is desired to hold the inner tire from creeping on the rim and in the casing, a bolt 33 is prepared rigid with a disk 34 upon its inner end and screw-threads 35 upon its outer end. The bolt is placed in the mold and and the tread support 1 is cast around the bolt with the bolt protruding like an air tube protruding from an inner tube. Then when the casing carrying the inner tire is placed upon a rim the bolt 33 is placed through the air valve opening in the rim and through the felly, a nut 36 is screwed down upon the threads 35 against the felly, and a cap 37 screwed upon the end of the bolt to make an appearance of an air valve. The bolt 33 passing through the rim and felly will hold the tire from creeping upon the rim and felly and will present the appearance of a tire having an air valve.

I claim:

1. An inner tire comprising a tread having a curved outer face adapted to fit the inner face of a casing and extending substantially sixty degrees each way from a vertical central plane and having flat faces extending radially inwardly from the outer edges of the curved face and meeting at the axial center, and a tread support having a V-shaped annular groove fitting the inner halves of the flat faces and having curved faces extending outwardly from the flat faces and from the groove and having curved faces adapted to fit the inner faces of the casing and a face adapted to fit the outer face of a tire rim upon which the casing is mounted.

2. An inner tire comprising a tread having a curved outer face adapted to fit the inner face of a casing and extending substantially sixty degrees each way from a vertical central plane and having flat faces extending radially inwardly from the outer edges of the curved face and meeting at the axial center, and a tread support having a V-shaped annular groove fitting the inner halves of the flat faces and having curved faces extending outwardly from the flat faces and from the groove; the outer ends of the curved faces being on a line with the axial center; and having second curved faces extending from the outer edges of the first curved faces and adapted to fit the inner face of the casing and having a face connecting the lower edges of the second curved faces and adapted to fit the outer face of a tire rim upon which the casing is mounted.

In testimony whereof I have signed my name to this specification.

HENRY M. HENNING.